(12) United States Patent
Tsutsui et al.

(10) Patent No.: US 7,199,550 B2
(45) Date of Patent: Apr. 3, 2007

(54) METHOD OF OPERATING A SECONDARY BATTERY SYSTEM HAVING FIRST AND SECOND TANKS FOR RESERVING ELECTROLYTES

(75) Inventors: Yasumitsu Tsutsui, Osaka (JP); Nobuyuki Tokuda, Osaka (JP)

(73) Assignees: Sumitomo Electric Industries, Ltd., Osaka (JP); The Kansai Electric Power Co., Inc., Osaka (JP)

( * ) Notice: Subject to any disclaimer, the term of this patent is extended or adjusted under 35 U.S.C. 154(b) by 366 days.

(21) Appl. No.: 10/476,586

(22) PCT Filed: Apr. 24, 2002

(86) PCT No.: PCT/JP02/04109

§ 371 (c)(1),
(2), (4) Date: Apr. 13, 2004

(87) PCT Pub. No.: WO02/091512

PCT Pub. Date: Nov. 14, 2002

(65) Prior Publication Data

US 2004/0169493 A1    Sep. 2, 2004

(30) Foreign Application Priority Data

May 1, 2001    (JP)    ............................. 2001-134021

(51) Int. Cl.
*H01M 10/44*    (2006.01)

(52) U.S. Cl. ......................................... 320/101; 307/66
(58) Field of Classification Search ................ 320/101, 320/103, 132, 149; 307/66; 429/12, 13, 429/14
See application file for complete search history.

(56) References Cited

FOREIGN PATENT DOCUMENTS

| JP | 62-35461 A | 2/1987 |
|----|------------|--------|
| JP | 62-86667 A | 4/1987 |
| JP | 9-283169 A | 10/1997 |

*Primary Examiner*—Edward H. Tso
(74) *Attorney, Agent, or Firm*—McDermott Will & Emery LLP

(57) ABSTRACT

The invention provides a secondary battery system that allows a high overload operation regardless of discharging condition during a steady operation, and an operating method thereof. The secondary battery system comprises first tanks 31, 32 for reserving electrolytes required for a steady operation, and second tanks 33, 34 for reserving electrolytes required for an emergency operation. Valves 41–48 are opened and closed for allowing selective switching between the electrolytes in the first tanks 31, 32 and the electrolytes in the second tanks 33, 34 to circulate the selected electrolytes through a cell stack 100. The electrolytes reserved in the second tanks 33, 34 are electrolytes having a proportion of a quantity of active material produced in a charging reaction to a total quantity of active material of not less than 50%.

3 Claims, 7 Drawing Sheets

METHOD OF OPERATING A SECONDARY BATTERY SYSTEM HAVING FIRST AND SECOND TANKS FOR RESERVING ELECTROLYTES

TECHNICAL FIELD

The present invention relates to a secondary battery system and, more particularly, to a redox flow battery that can allow a high overload operation even in case of emergency such as electric power failure.

BACKGROUND ART

FIG. 6 is an explanatory view showing an operating principle of a redox flow battery. As illustrated therein, the redox flow battery has a cell 1 separated into a positive electrode cell 1A and a negative electrode cell 1B by a membrane 4 of an ion-exchange membrane. The positive electrode cell 1A and the negative electrode cell 1B include a positive electrode 5 and a negative electrode 6, respectively. A positive electrode tank 2 for feeding and discharging positive electrolytic solution to and from the positive electrode cell 1A is connected to the positive electrode cell 1A through conduit pipes 7, 8. Similarly, a negative electrode tank 3 for feeding and discharging negative electrolytic solution to and from the negative electrode cell 1B is connected to the negative electrode cell 1B through conduit pipes 10, 11. Aqueous solution containing ions that change in valence, such as vanadium ion, is used for the positive and negative electrolytes. The electrolyte containing the ions is circulated by using pumps 9, 12, to charge and discharge the electrolyte with the change in ionic valence at the positive and negative electrodes 5, 6. When the electrolyte containing the vanadium ions is used, the following reactions occur in the cell during the charge and discharge of electricity:

Positive electrode: $V^{4+} \rightarrow V^{5+} + e^-$ (Charge) $V^{4+} \leftarrow V^{5+} + e^-$ (Discharge)

Negative electrode: $V^{3+} + e^- \rightarrow V^{2+}$ (Charge) $V^{3+} + e^- \leftarrow V^{2+}$ (Discharge)

FIG. 7 is a diagrammatic illustration of construction of a cell stack used for the redox flow battery mentioned above. This type of battery usually uses the construction which is called a cell stack 100 comprising a plurality of cells stacked in layers. Each of the cells has the positive electrode 5 and the negative electrode 6 which are made of carbon felt and disposed at both sides of the membrane 4. It also has cell frames 20 disposed at the outside of the positive electrode 5 and at the outside of the negative electrode 6, respectively.

Each of the cell frames 20 has a bipolar plate 21 made of carbon plastic and a frame 22 formed around the outside of the bipolar plate 21.

The frame 22 has a plurality of holes which are called manifolds 23A, 23B. The manifolds 23A, 23B are arranged to form flow channels of the electrolytic solutions when a number of cells are stacked in layers and communicate with the conduit pipes 7, 8, 10, 11 of FIG. 6.

The redox flow battery is usually used with the aim of allowing load-leveling through the steady operation that electricity is discharged during daytime when more electric power consumption is required and electricity is charged (stored) during nighttime when less electric power consumption is required. For the load-leveling, high efficient operation of the battery is desirable from the viewpoints of energy saving and cost reduction. On the other hand, in case of emergency such as an instantaneous electric power failure in the steady operation, it is desirable to bypass the efficient operation in favor of highest possible overload operation of the battery. It should be noted here that the term "overload operation" means operation at an output in excess of a rated output, and the term "rated output" means an output at which energy efficiency during the charge/discharge of electricity reaches a design value or more. In general, the rated output is often set at about 80% of the maximum output.

The redox flow battery can allow a comparative high overload operation when it is in the fully charged state, but it cannot allow the overload operation substantially when electric energies stored in the electrolyte are less at the end stage of discharge or after the end of discharge.

This is because when the electrolyte is high in state of charge, the redox flow battery can allow a high overload output, while however, when the electrolyte drops in state of charge, the voltage is reduced, making it hard for the redox flow battery to allow the overload output. The expression "the electrolyte is high in state of charge" indicates the state that when a vanadium-based electrolyte is used for the electrolyte, the electrolyte for the positive electrode has a high ratio "(concentration of quinquevalent vanadium ions)/(concentration of tetravalent+quinquevalent vanadium ions)" and the electrolyte for the negative electrode has a high ratio "(concentration of bivalent vanadium ions)/(concentration of bivalent+trivalent vanadium ions)".

For allowing this overload operation, the conventional redox flow batteries require a largely increased amount of electrolyte and also require that the electrolyte be constantly kept high in state of charge even after discharging in the steady operation. However, the load-leveling operation requires a fluid volume of electrolyte corresponding to its capacity of a few hours or more, and to obtain the constant increase in the state of charge by increasing the fluid volume of electrolyte requires a significantly large amount of electrolytes.

Accordingly, it is a primary object of the present invention to provide a secondary battery system that can allow a high overload operation even in the discharge state during the steady operation, and an operating method thereof.

DISCLOSURE OF THE INVENTION

In order to accomplish the object mentioned above, the present invention is constructed so that electrolytes having a high state of charge for an emergency operation are reserved, in addition to electrolytes for a steady operation, so that when an accident such as electric power failure occurs, the electrolytes for emergency operation are fed to a battery cell reliably.

Specifically, the present invention provides a secondary battery system comprising at least one set of first tanks for reserving electrolytes required for a steady operation, at least one set of second tanks for reserving electrolytes required for an emergency operation, and switching means for allowing selective switching between the electrolytes in the first tanks and the electrolytes in the second tanks to circulate the selected electrolytes through a cell, wherein the electrolytes reserved in the second tanks are electrolytes having a proportion of a quantity of active material produced in a charging reaction to a total quantity of active material of not less than 50%.

During the steady load-leveling operation, the electrolytes in the first tanks are used to charge and discharge electricity. During the emergency operation such as electric power failure, the electrolytes in the first tanks are switched to the electrolytes in the second tanks, then discharging electricity. As a result of this, the electrolytes in the second tanks that are kept high in state of charge are fed to the cell at any time, so that the high overload operation is ensured, regardless of the discharge condition of the first tanks.

For determining an output value of an electrical overload output at a high overload rate during the operation, the state of charge of the electrolytes fed to the cell is a more important factor than a total capacity of the electrolytes remaining in the tanks. Due to this, even when a large quantity of electrolyte of a low state of charge is contained in the tanks, they do not produce the expected output of the overload.

In general, a quantity of electrolyte corresponding to the capacity of the order of eight hours is required for charge or discharge of electricity for a load-leveling purpose. On the other hand, a quantity of electrolyte corresponding to the capacity of the order of two hours at largest is just required for electricity required for an emergency operation such as for example during the time of electric power failure. Due to this, when the state of charge is tried to be always kept high by increasing a quantity of electrolyte without the switching of the electrolyte, as conventionally, a large quantity of electrolyte is required and the tanks are also required to be increased in size. In contrast to this, when the switching of the electrolytes according to the present invention is used, a relatively small quantity of electrode is only required for emergency operation and thus the second tanks of a smaller size than the first tanks is also required.

It is to be noted here that the term "a set of" used for both the first tanks and the second tanks means that a tank for reserving the positive electrolyte and a tank for reserving the negative electrode are paired.

Electrolyte that is in a substantially fully charged state or in a nearly fully charged state is used for the electrolytes reserved in the set of second tanks. In other words, the electrolyte of high in state of charge is used therefor. The expression "the electrolyte is high in state of charge" indicates the state that when a vanadium-based electrolyte is used for the electrolyte, the electrolyte for the positive electrode has a high ratio "(concentration of quinquevalent vanadium ions)/(concentration of tetravalent+quinquevalent vanadium ions)" and the electrolyte for the negative electrode has a high ratio "(concentration of bivalent vanadium ions)/(concentration of bivalent+trivalent vanadium ions)". It is preferable that a ratio of (concentration of quinquevalent vanadium ions)/(concentration of tetravalent+quinquevalent vanadium ions) is the order of not less than 50% and a ratio of (concentration of bivalent vanadium ions)/(concentration of bivalent+trivalent vanadium ions) is the order of not less than 50%.

Valves are preferably used as the switching means. Preferably, the secondary battery system comprises an association mechanism for controlling the switching means on the side on which the electrolytes are discharged from the first tanks or the second tanks and the switching means on the side on which the electrolytes are fed to the first tanks or the second tanks in association with each other. This associated switching operation can allow balancing of a quantity of electrolytes discharged from the tanks and a quantity of electrolytes fed to the tanks at the switching of the tanks, to prevent imbalance of quantity of electrolytes in the cell or generation of considerable pressure change. The associated control of the switching means can be easily realized by electrically controlling the open/close of the valves.

It is preferable that there are provided electrolyte circulation pumps between the switching means on the side on which the electrolytes are discharged from the first tanks or the second tanks and the cell. This arrangement can provide the result that the pumps for the first tanks and the pumps for the second tanks can be combined for common use. Needless to say, the pumps for feeding the electrolytes from the first tanks to the cell and the pumps for feeding the electrolytes from the second tanks to the cell may be provided separately from each other.

Further, the present invention provides an operating method of a secondary battery system which in case of emergency operation allows a switching to electrolytes for emergency operation of at least equal in state of charge to electrolytes for steady operation.

BEST MODE FOR CARRYING OUT THE INVENTION

In the following, certain preferred embodiments of the present invention are described.

(First Embodiment)

Figure 1:
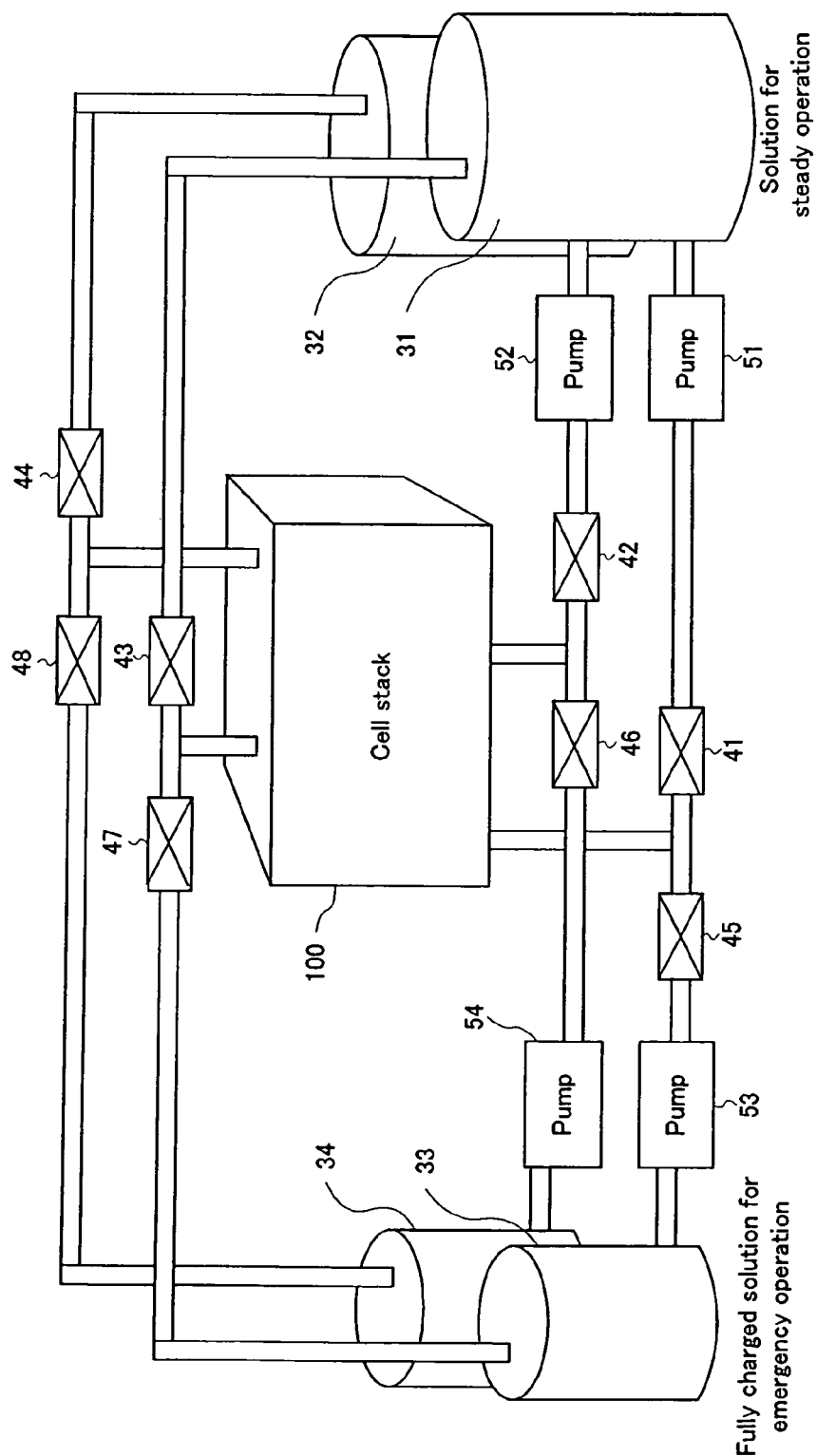
FIG. 1 is a diagrammatic illustration of construction of a redox flow battery system of the present invention.

FIG. 1 is a diagrammatic illustration of construction of a redox flow battery system of the present invention.

This battery system comprises a single cell stack 100, two sets of tanks 31, 32 and 33, 34 for reserving electrolytes, valves 41–48 for allowing switching of the electrolytes contained in the tanks 31–34, to selectively supply the electrolytes to the cell stack 100, and pumps 51–54 for circulating the electrolytes.

Figure 6:
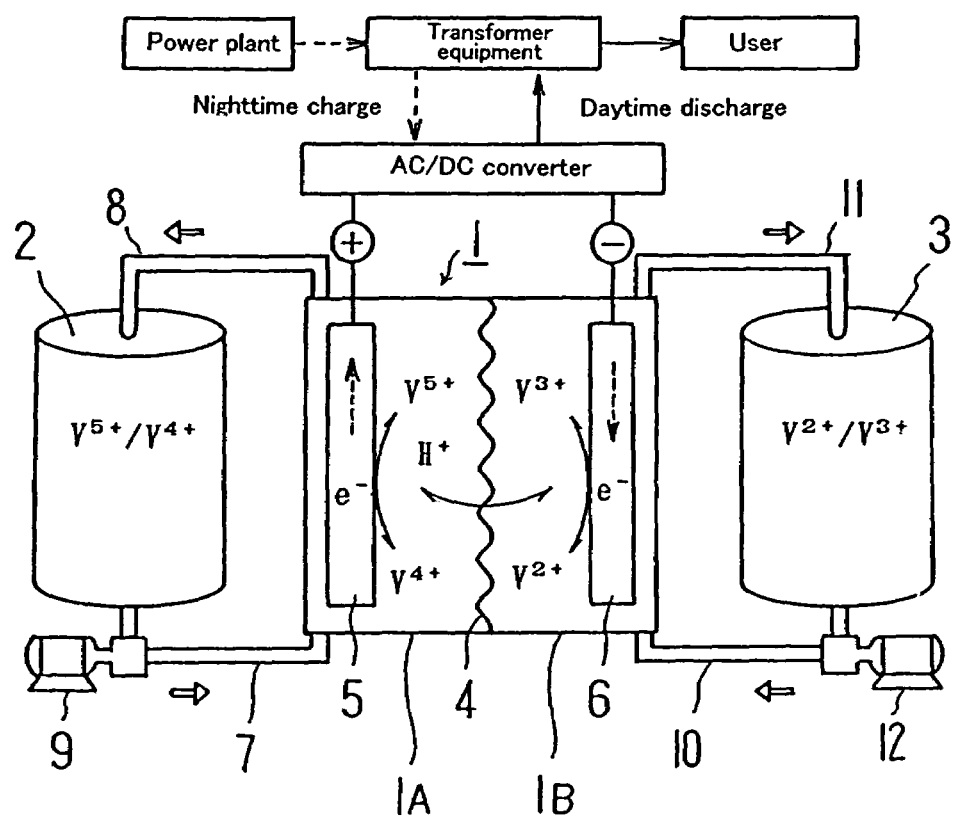
FIG. 6 is an explanatory view of an operating principle of a redox flow battery.
Figure 7:
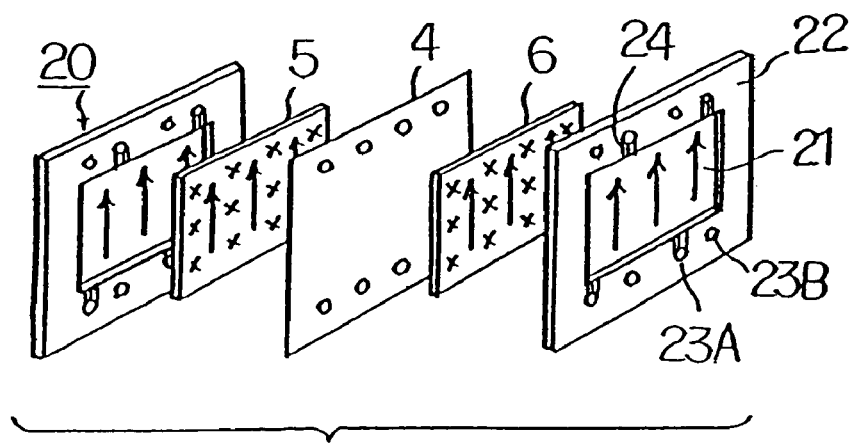
FIG. 7 is an illustration of construction of a cell stack of the redox flow battery.
Figure 7:
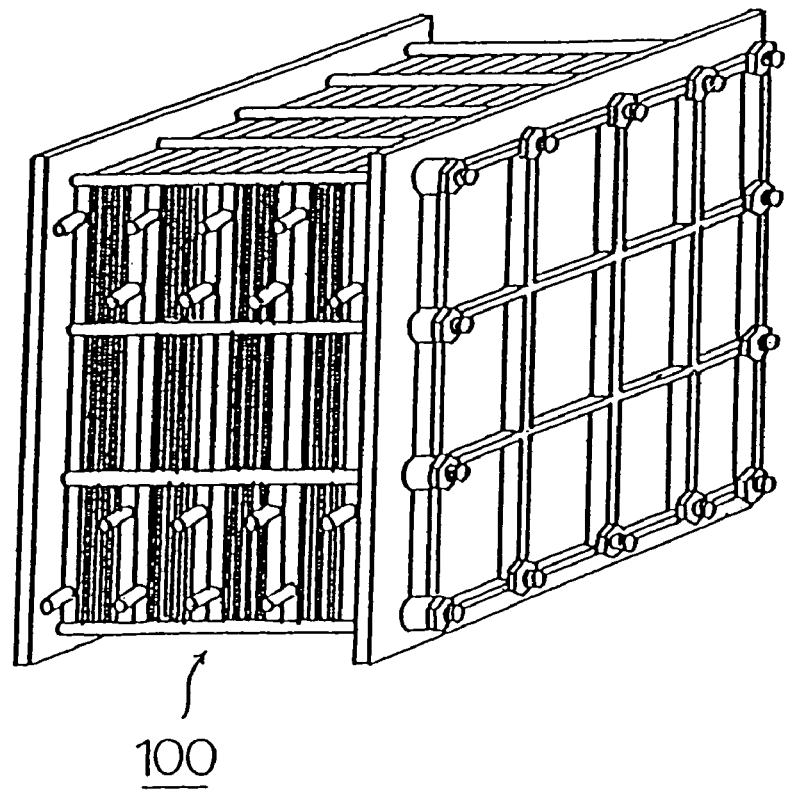

The cell stack 100 is identical in construction to the conventional one, as illustrated in FIGS. 6 and 7.

The tanks 31–34 comprise the first tanks 31, 32 for supplying the electrolytes to the cell stack for the purpose of load-leveling during the steady operation and the second tanks 33, 34 for supplying the electrolytes to the cell stack in an emergency operation, such as during the time of electric power failure. The first tanks and the second tanks comprise positive electrolyte tanks 31, 33 and negative electrolyte tanks 32, 34, respectively.

Vanadium-based electrolytes are used for the electrolytes reserved in the first tanks and the second tanks. The positive electrolyte contains $V^{4+}/V^{5+}$ ions and the negative electrolyte contains $V^{3+}/V^{2+}$ ions.

Fully charged electrolytes are used for the electrolytes reserved in the set of second tanks 33, 34. The electrolyte having a high ratio of "(concentration of quinquevalent vanadium ions)/(concentration of tetravalent+quinquevalent vanadium ions)" may be used for the positive electrode and the electrolyte having a high ratio of "(concentration of bivalent vanadium ions)/(concentration of bivalent+trivalent vanadium ions)" may be used for the negative electrode.

There are provided a total of eight valves 41–48, including the valves 41, 42 for controlling the supply of the electrolyte from the set of first tanks 31, 32 to the cell stack 100, the valves 43, 44 for controlling the discharge of the electrolyte from the cell stack 100 to the set of first tanks 31, 32, the valves 45, 46 for controlling the supply of the electrolyte from the set of second tanks 33, 34 to the cell stack 100, and the valves 47, 48 for controlling the discharge of the electrolyte from the cell stack 100 to the set of second tanks 33, 34.

There are provided a total of four pumps 51–54, including the pump 51 for feeding the positive electrolyte from the first tank 31, the pump 52 for feeding the negative electrolyte from the first tank 32, the pump 53 for feeding the positive electrolyte from the second tank 33, and the pump 54 for feeding the negative electrolyte from the second tank 34.

In the redox flow battery system thus constructed, during the steady operation for load-leveling and the like, the electrolytes in the first tanks 31, 32 are used for the charge and discharge of electricity. During this steady operation, the pumps 53, 54 are put in its inoperative state, with the valves 45–48 closed, while on the other hand, the pumps 51, 52 are bought into operation, with the valves 41–44 opened. In the steady operation, when the electrolytes in the first tanks are high in state of charge, such as, for example, immediately after electrically charged, the redox flow battery can allow a high overload operation, while however, at the end stage of discharge or after completion of discharge, it is too hard for the redox flow battery to allow the high overload operation.

Figure 2:
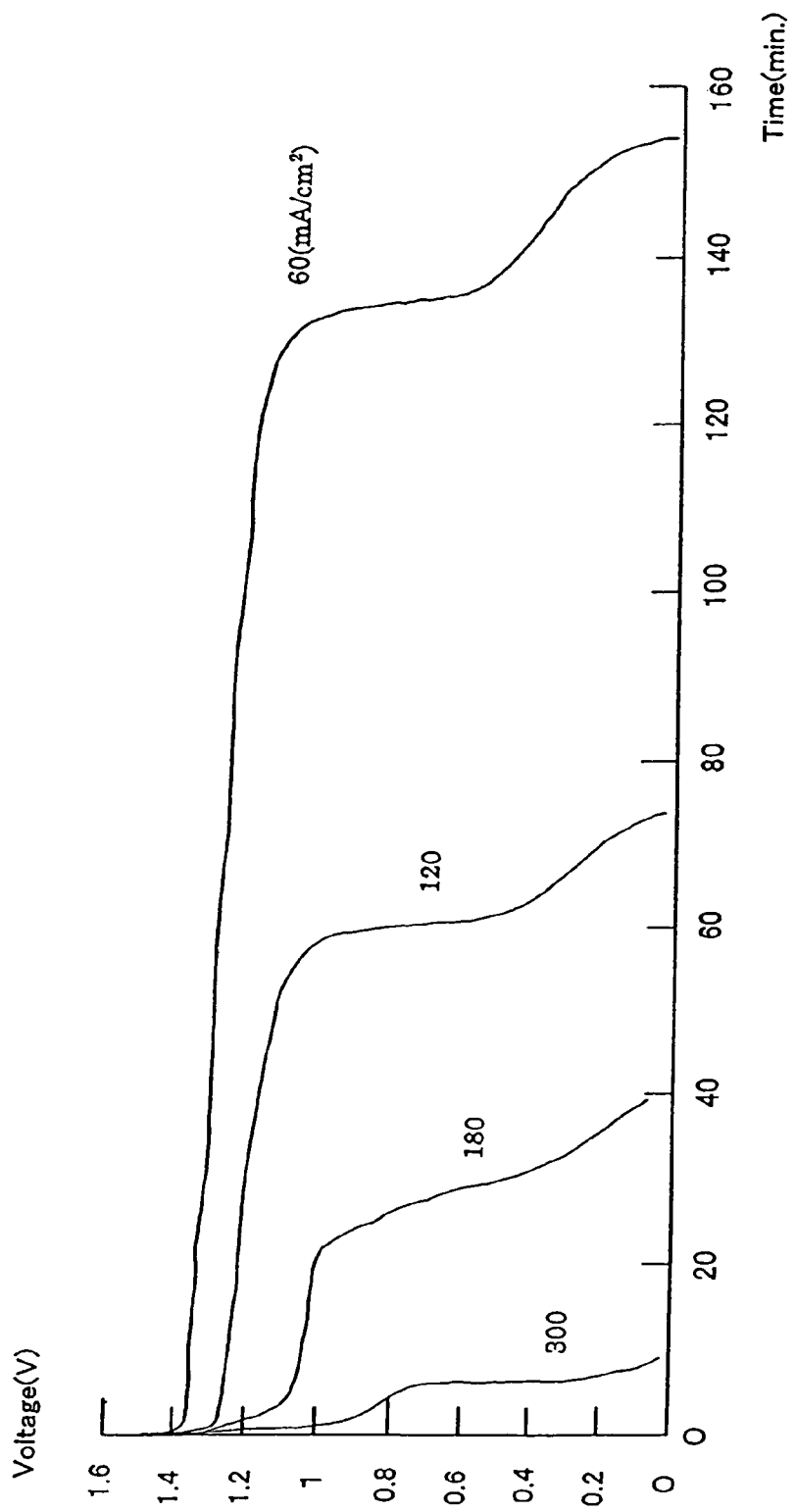
FIG. 2 is a graph showing the properties of the redox flow battery when discharging in its fully charged state.
Figure 3:
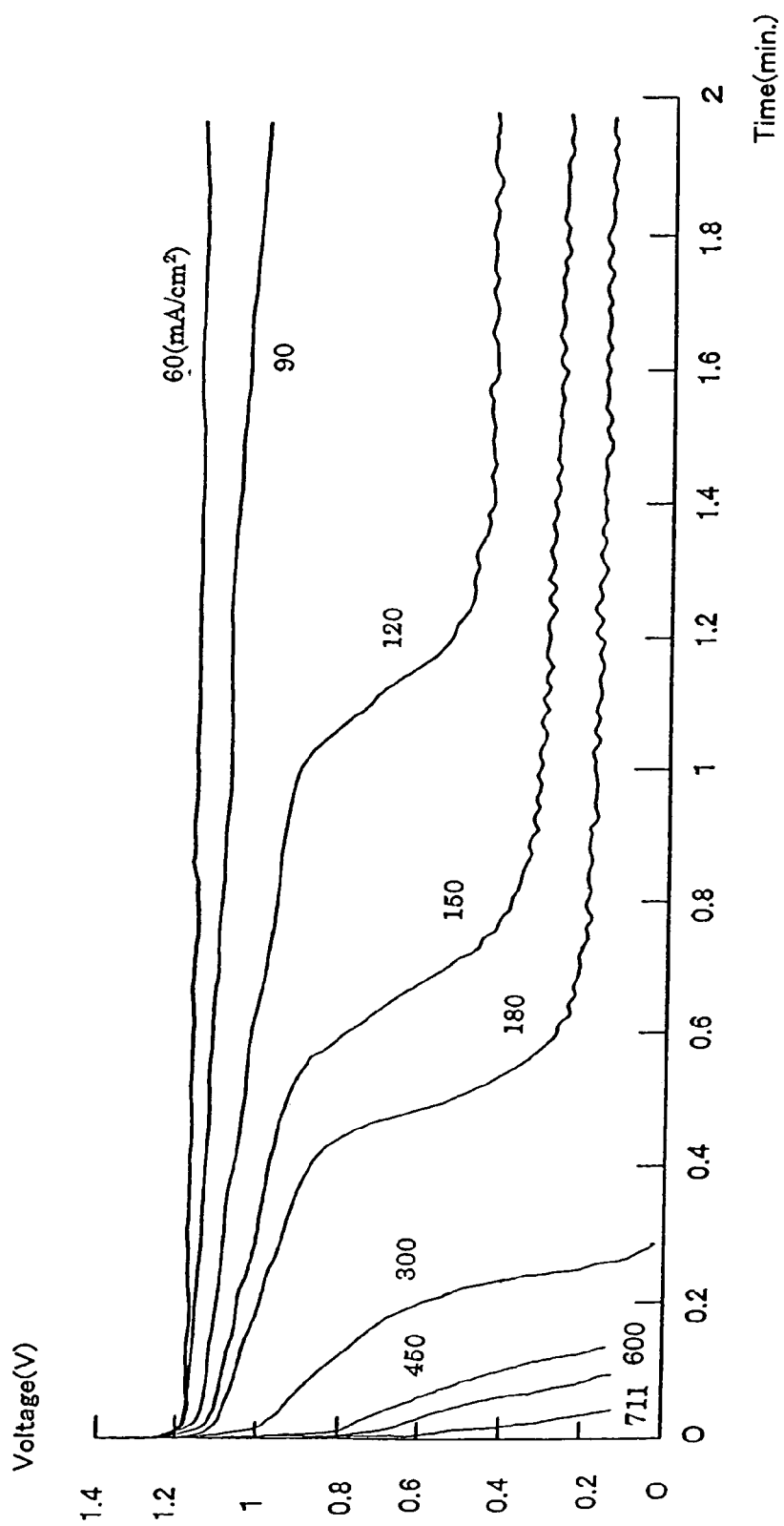
FIG. 3 is a graph showing the properties of the redox flow battery when discharging from the end stage of discharge.

FIG. 2 is a graph showing the properties of the redox flow battery when discharging in its fully charged state. FIG. 3 is a graph showing the properties of the redox flow battery when discharging at the end stage of discharge. The graph of FIG. 2 shows a discharge curve plotted when a battery having a capability of about two hours at a discharging rate of 60 mA/cm$^2$ is discharged in its fully charged state of 1.55V. The graph of FIG. 3 shows a discharge curve plotted when the battery having a capability of about two hours at a discharging rate of 60 mA/cm$^2$ is discharged for one hour and forty-eight minutes, first, and, then, discharged in its charged state of 1.21V. It will be understood from comparison between both graphs that the battery can allow an output at a high voltage when it is in the state in which the electrolyte is fully charged to be high in state of charge, while on the other hand, it can allow substantially no overload operation when it is at an end stage of discharge at which the electrolyte is low in state of charge to cause a significant drop of voltage in the cell leading to a stop of discharge.

On the other hand, during an emergency operation, such as during the time of electric power failure, the electrolytes to be fed to the cell stack 100 are switched from the electrodes in the first tanks 31, 32 to the electrodes in the second tanks 33, 34 to discharge electricity, so as to allow the high overload operation. The switching is controlled by closing the valves 41–44 and stopping the pumps 51, 52 and, then, opening the valves 45–48 and bringing the pumps 53, 54 into operation. Since the electrolytes in the second tanks 33, 34 are kept high in state of charge, the battery can allow the high overload operation at any time, regardless of the state of charge of the electrolytes in the first tanks.

It is preferable that when the electrolytes to be fed to the cell stack are switched, switching operation of the valves 41, 42, 45, 46 arranged on the side on which the electrolytes are discharged from the first and second tanks and switching operation of the valves 43, 44, 47, 48 arranged on the side on which the electrolytes are fed to the first and second tanks are controlled in association with each other. This associated switching operation of the valves can allow balancing of a quantity of electrolytes discharged from the tanks and a quantity of electrolytes fed to the tanks at the switching of the tanks, to prevent imbalance of quantity of electrolytes in the cell or generation of considerable pressure change.

(Second Embodiment)

Figure 4:
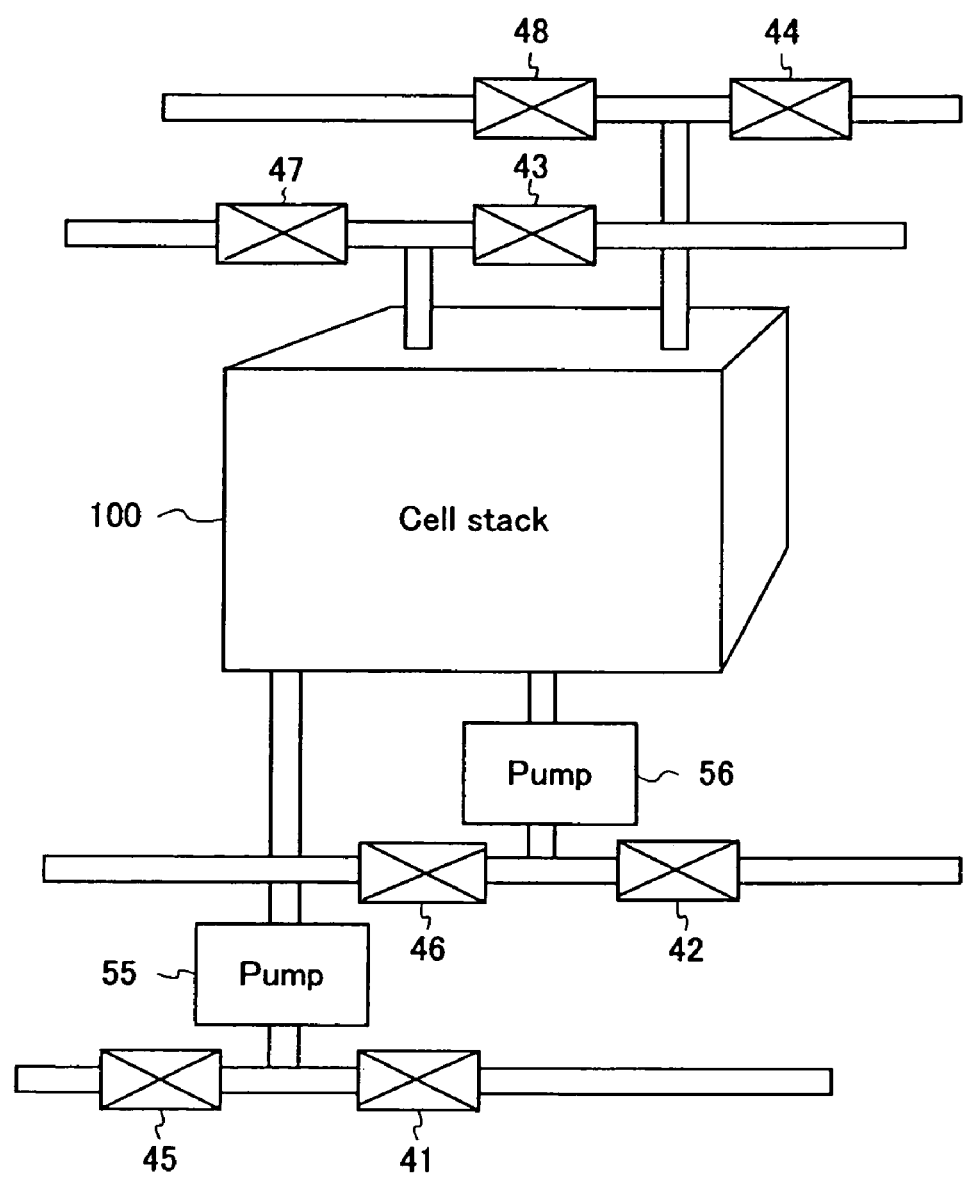
FIG. 4 is a diagrammatic illustration of a part of a shared-pump type of redox flow battery system of the present invention.

While in the first embodiment, the pumps 51, 52 and the pumps 53, 54 are placed for the electrolytes of the first tanks 31, 32 and the second tanks 33, 34, respectively, the pumps for each set of tanks may be combined for common use. FIG. 4 is a diagrammatic illustration of a part of a shared-pump type of redox flow battery system of the present invention. In this illustration, like reference characters refer to corresponding parts of FIG. 1.

As illustrated, pumps 55, 56 are interposed between an intermediate part of piping between the valves 41, 45 and the cell stack 100 and between an intermediate part of piping between the valves 42, 46 and the cell stack 100, respectively, for connection between the valves and the cell stack. This can allow selective switching between the electrolytes in the first tanks and the electrolytes in the second tanks and circulation of the selected electrolytes by using a total of two pumps 55, 56.

The switching operation (open/close operation) of the valves 41–48 required for the switching of the electrolytes is identical with that of the first embodiment.

(Third Embodiment)

Figure 5:
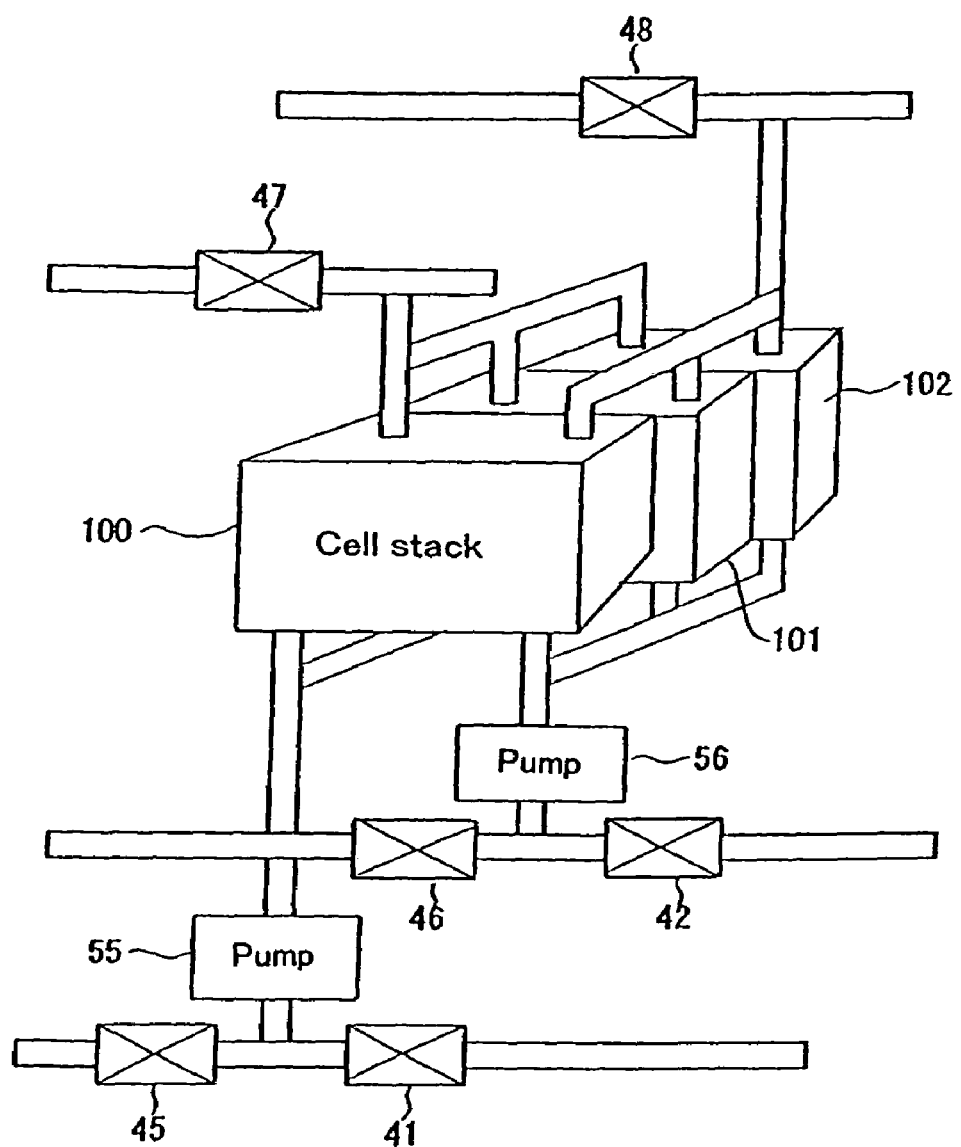
FIG. 5 is a diagrammatic illustration of a part of a redox flow battery system having a plurality of cell stacks of the present invention.

Further, a diagrammatic illustration of a part of a redox flow battery system having a plurality of cell stacks 100–102 is shown in FIG. 5. In this third embodiment as well, the selective switching between the electrolytes in the first tanks and the electrolytes in the second tanks is controlled by the valves 41–48 being opened and closed in the same manner as in the first embodiment. Thus, the high overload operation can be provided, regardless of the state of charge of the electrolytes in the first tanks.

Capabilities of Exploitation in Industry

As described above, according to the battery of the present invention, there are provided specific tanks for storing the electrolytes that are constantly kept in the substantially fully charged state, in addition to the tanks for electrolytes for used in the steady load-leveling operation. This can provide the result that in case of emergency, the required electrolytes can be fed from those specific tanks for the overload operation for any condition for the load-leveling operation.

The invention claimed is:

1. A method of operating a secondary battery system, the secondary battery system including at least one set of first tanks for reserving electrolytes required for a steady operation, at least one set of second tanks for reserving electrolytes required for an emergency operation, and switching means for allowing selective switching between the electrolytes in the first tanks and the electrolytes in the second tanks to circulate the selected electrolytes through a cell, the method comprising:

reserving electrolytes having a proportion of a quantity of active material produced in a charging reaction to a total quantity of active material of not less than 50% in the second tanks for the emergency operation;

using the electrolytes in the first tanks to charge and discharge electricity to ensure operation at a rated output during the steady operation;

switching from using the electrolytes in the first tanks to using the electrolytes in the second tanks during the emergency operation; and using the electrolytes in the second tanks to charge and discharge electricity to ensure an overload operation at an output in excess of the rated output during the emergency operation.

2. The method according to claim 1, wherein the overload operation is a high overload operation at twice or more the rated output.

3. The method according to claim 2, wherein the switching of electrolytes is performed in association with opening/closing of valves on a side on which the electrolytes are discharged from the first tanks or the second tanks and opening/closing of valves on a side on which the electrolytes are fed to the first or second tanks.

* * * * *